US012749993B2

(12) United States Patent
Mohammed et al.

(10) Patent No.: US 12,749,993 B2
(45) Date of Patent: Sep. 29, 2026

(54) BRAKING CONTROL ASSEMBLY FOR AN AIRCRAFT GAS TURBINE ENGINE AND METHOD OF USING SAME

(71) Applicant: Pratt & Whitney Canada Corp., Longueuil (CA)

(72) Inventors: Kashif Mohammed, Brossard (CA); Patrick Manoukian, Pierrefonds (CA); Patrice Remy, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/199,705

(22) Filed: May 19, 2023

(65) Prior Publication Data

US 2024/0388230 A1 Nov. 21, 2024

(51) Int. Cl.

| | |
|---|---|
| ***H02P 9/08*** | (2006.01) |
| ***F01D 19/00*** | (2006.01) |
| ***F01D 21/02*** | (2006.01) |
| ***F02C 7/268*** | (2006.01) |
| ***F02C 7/275*** | (2006.01) |
| ***H02P 3/12*** | (2006.01) |
| ***H02P 3/22*** | (2006.01) |

(52) U.S. Cl.

CPC ................ *H02P 9/08* (2013.01); *F01D 19/00* (2013.01); *F01D 21/02* (2013.01); *F02C 7/268* (2013.01); *F02C 7/275* (2013.01); *H02P 3/12* (2013.01); *H02P 3/22* (2013.01); *F05D 2220/76* (2013.01)

(58) Field of Classification Search

CPC .......... F02C 7/268; F02C 7/275; F01D 19/00; F01D 21/00; F01D 21/02; H02P 9/08; H02P 9/38; H02P 9/302; H02P 9/30

See application file for complete search history.

(56) References Cited

U.S. PATENT DOCUMENTS 2,605,454 A * 7/1952 Grepe ....................... H02P 3/12 318/261
3,812,411 A 5/1974 Johnson
(Continued)

OTHER PUBLICATIONS

EP Search Report for EP Patent Application No. 24176782.1 dated Sep. 30, 2024.

*Primary Examiner* — Gerald L Sung
*Assistant Examiner* — Jingchen Liu
(74) *Attorney, Agent, or Firm* — Getz Balich LLC

(57) ABSTRACT

An assembly for a gas turbine engine of an aircraft includes a rotational assembly, a starter generator, and a control relay. The starter generator is coupled with the rotational assembly. The starter generator is configured to selectively drive rotation of the rotational assembly. The starter generator includes a motor winding including a first electrical terminal and a second electrical terminal. The control relay includes a switch electrically connected to the first electrical terminal. The switch is positionable in a first contact position and a second contact position, in the first contact position, the first electrical terminal is electrically isolated from the second electrical terminal through the switch. In the second contact position, the first electrical terminal is electrically connected to the second electrical terminal through the switch such that a closed electrical circuit is formed through the motor winding, the first electrical terminal, the second electrical terminal, and the switch.

15 Claims, 5 Drawing Sheets

(56) References Cited

U.S. PATENT DOCUMENTS

| | | | | |
|---|---|---|---|---|
| 4,119,861 | A * | 10/1978 | Gocho | F01D 19/00 290/51 |
| 4,724,331 | A * | 2/1988 | Nordlund | F02C 7/268 290/27 |
| 5,430,362 | A | 7/1995 | Carr | |
| 7,262,571 | B2 * | 8/2007 | Nelson | H02P 3/22 318/471 |
| 7,621,117 | B2 | 11/2009 | Dooley | |
| 7,849,668 | B2 | 12/2010 | Sheridan | |
| 9,885,288 | B2 | 2/2018 | Francisco | |
| 10,180,080 | B2 | 1/2019 | Munevar | |
| 2004/0160208 | A1 * | 8/2004 | Youm | H02P 3/22 318/801 |
| 2012/0180498 | A1 | 7/2012 | Francisco | |
| 2015/0097372 | A1 * | 4/2015 | Patel | F02C 7/275 290/46 |
| 2016/0251977 | A1 | 9/2016 | Gates | |
| 2020/0283138 | A1 | 9/2020 | Mohammed | |

* cited by examiner

BRAKING CONTROL ASSEMBLY FOR AN AIRCRAFT GAS TURBINE ENGINE AND METHOD OF USING SAME

TECHNICAL FIELD

This disclosure relates generally to aircraft gas turbine engines and, more particularly, to a braking control assembly for an aircraft gas turbine engine.

BACKGROUND OF THE ART

Gas turbine engines for aircraft propulsion systems and auxiliary power units (APUs) may be susceptible to windmilling during various operating conditions of the gas turbine engines. Various systems and methods are known in the art for preventing or mitigating gas turbine engine windmilling. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for a gas turbine engine of an aircraft includes a rotational assembly, a starter generator, and a control relay. The starter generator is coupled with the rotational assembly. The starter generator is configured to selectively drive rotation of the rotational assembly. The starter generator includes a motor winding including a first electrical terminal and a second electrical terminal. The control relay includes a switch electrically connected to the first electrical terminal. The switch is positionable in a first contact position and a second contact position, in the first contact position, the first electrical terminal is electrically isolated from the second electrical terminal through the switch. In the second contact position, the first electrical terminal is electrically connected to the second electrical terminal through the switch such that a closed electrical circuit is formed through the motor winding, the first electrical terminal, the second electrical terminal, and the switch.

In any of the aspects or embodiments described above and herein, the assembly may further include a battery electrically connected to the starter generator and the switch such that, in the first contact position, the battery is configured to supply electrical power to the starter generator.

In any of the aspects or embodiments described above and herein, the starter generator may be configured to drive rotation of the rotational assembly with the switch in the first contact position.

In any of the aspects or embodiments described above and herein, the starter generator may be configured to resist rotation of the rotational assembly with the switch in the second contact position.

In any of the aspects or embodiments described above and herein, the starter generator may be coupled with the rotational assembly by a gearbox.

In any of the aspects or embodiments described above and herein, the rotational assembly may include a shaft, a bladed compressor rotor, and a bladed turbine rotor. The shaft may interconnect the bladed compressor rotor and the bladed turbine rotor.

In any of the aspects or embodiments described above and herein, the assembly may further include a main generator coupled with the rotational assembly. The rotational assembly may be configured to drive rotation of the main generator.

In any of the aspects or embodiments described above and herein, the control relay may include a variable resistor. With the switch in the second contact position, the variable resistor may be configured to selectively vary an electrical resistance between the first electrical terminal and the second electrical terminal.

In any of the aspects or embodiments described above and herein, the assembly may further include a controller connected in communication with the control relay. The controller may include a processor in communication with a non-transitory memory storing instructions, which instructions when executed by the processor, may cause the processor to control the control relay to position the switch in the first contact position or the second contact position.

In any of the aspects or embodiments described above and herein, the instructions, when executed by the processor, may further cause the processor to control the control relay to position the switch in the second contact position during a shutdown process for the gas turbine engine.

In any of the aspects or embodiments described above and herein, the instructions, when executed by the processor, may further cause the processor to control the control relay to position the switch in the second contact position during the shutdown process for the gas turbine engine when a rotation speed of the rotational assembly decreases to or below a rotation speed threshold value.

In any of the aspects or embodiments described above and herein, the instructions, when executed by the processor, may further cause the processor to control the control relay to position the switch in the second contact position during a flight condition of the aircraft.

In any of the aspects or embodiments described above and herein, the instructions, when executed by the processor, may further cause the processor to control the control relay to position the switch in the second contact position during an overspeed condition of the rotational assembly.

In any of the aspects or embodiments described above and herein, the control relay may include a variable resistor connected in communication with the controller. The variable resistor may be configured to selectively vary an electrical resistance between the first electrical terminal and the second electrical terminal with the switch in the second contact position. The instructions, when executed by the processor, may further cause the processor to control the variable resistor to control the electrical resistance between the first electrical terminal and the second electrical terminal.

According to another aspect of the present disclosure, a method for controlling braking for a gas turbine engine of an aircraft is provided. The method includes identifying a windmilling condition of a rotational assembly of the gas turbine engine and controlling braking for the rotational assembly, in response to identifying the windmilling condition, with a starter generator coupled to the rotational assembly by electrically connecting a first electrical terminal and a second electrical terminal of a motor winding of the starter generator together with a control relay to apply a braking force to the rotational assembly with the starter generator.

In any of the aspects or embodiments described above and herein, the method may further include controlling an electrical resistance between the first electrical terminal and the second electrical terminal to control a magnitude of the braking force applied to the rotational assembly with the starter generator.

In any of the aspects or embodiments described above and herein, identifying the windmilling condition may include identifying a rotation speed of the rotational assembly is greater than or equal to a rotation speed threshold value while the gas turbine engine is inoperative.

According to another aspect of the present disclosure, an assembly for a gas turbine engine of an aircraft includes a main generator, a rotational assembly, a starter generator, and a control relay. The rotational assembly includes a shaft, a bladed compressor rotor, and a bladed turbine rotor. The shaft interconnects the bladed compressor rotor and the bladed turbine rotor. The rotational assembly is coupled with the main generator and configured to drive rotation of the main generator. The starter generator is coupled with the rotational assembly. The starter generator is configured to selectively drive rotation of the rotational assembly. The starter generator includes a motor winding including a first electrical terminal and a second electrical terminal. The control relay includes a switch positionable in a contact position to directly electrically connect the first electrical terminal to the second electrical terminal.

In any of the aspects or embodiments described above and herein, the assembly may further include a controller connected in communication with the control relay. The controller may include a processor in communication with a non-transitory memory storing instructions, which instructions when executed by the processor, may cause the processor to: identify a windmilling condition of the rotational assembly and control the control relay to position the switch in the contact position in response to the identified windmilling condition.

In any of the aspects or embodiments described above and herein, the control relay may include a variable resistor. With the switch in the contact position, the variable resistor may be configured to selectively vary an electrical resistance between the first electrical terminal and the second electrical terminal.

The present disclosure, and all its aspects, embodiments and advantages associated therewith will become more readily apparent in view of the detailed description provided below, including the accompanying drawings.

DETAILED DESCRIPTION

Figure 1:
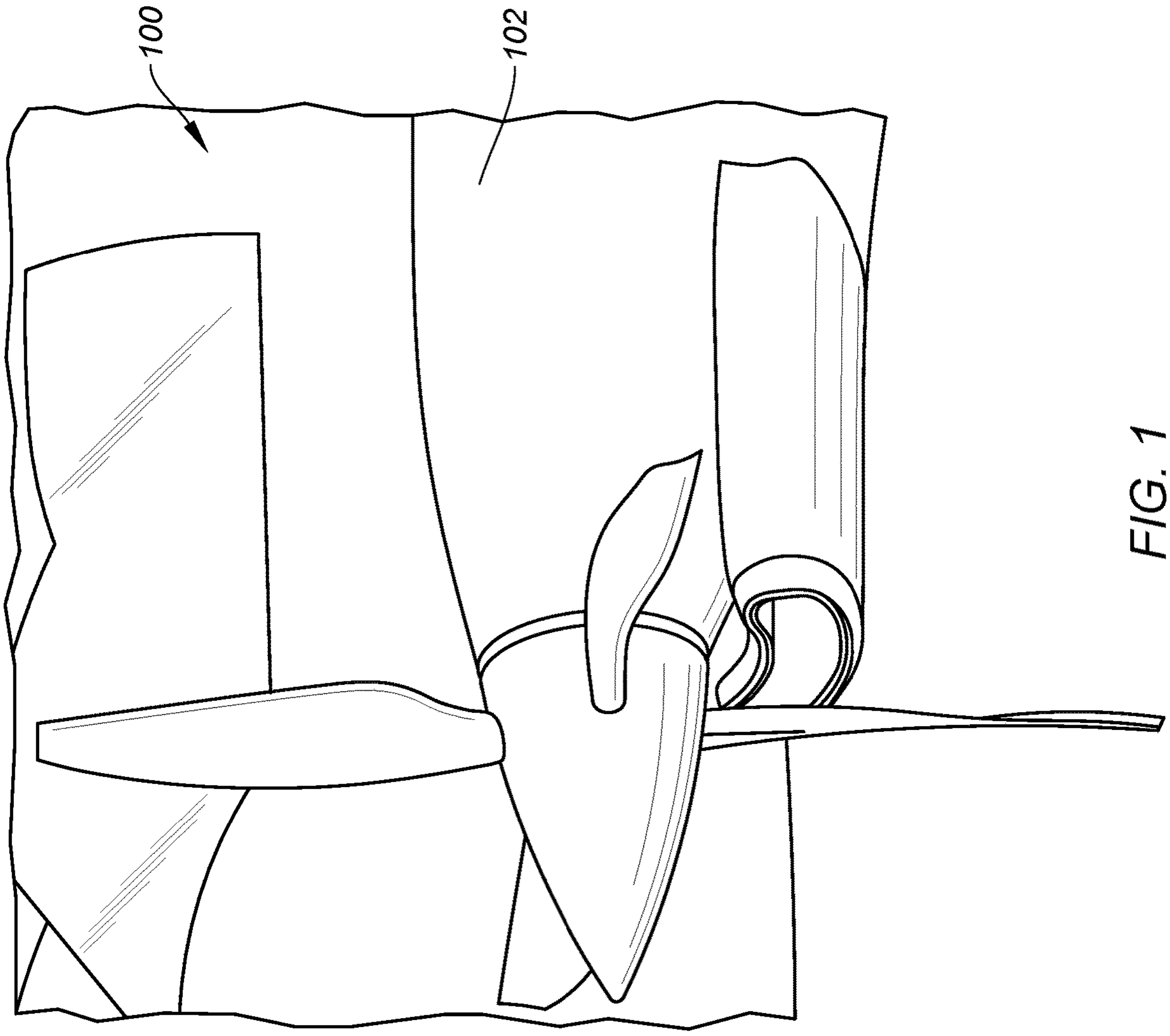
FIG. 1 illustrates a perspective view of a portion of an aircraft including a propulsion system, in accordance with one or more embodiments of the present disclosure.

FIG. 1 illustrates an aircraft 100 including at least one propulsion system 102. The aircraft 100 of FIG. 1 is configured as a fixed-wing aircraft (e.g., an airplane). However, the present disclosure is equally applicable to other aircraft 100 configurations such as, but not limited to, a rotary-wing aircraft (e.g., a helicopter), a tilt-rotor aircraft, a tilt-wing aircraft, or any other aerial vehicle. Moreover, the aircraft 100 may be a manned aerial vehicle or an unmanned aerial vehicle (UAV, e.g., a drone). The propulsion system 102 of FIG. 1 is configured as a turboprop gas turbine engine. However, the aircraft 100 is not limited to any particular propulsion system configuration and the present disclosure is also applicable to aircraft propulsion systems including other gas turbine engine configurations (e.g., a turbofan gas turbine engine, a turboshaft gas turbine engine, a turbojet gas turbine engine, etc.) as well as rotary engines, internal combustion piston engines, a hybrid-electric internal combustion engines, battery-electric propulsion systems, or the like.

Figure 2:
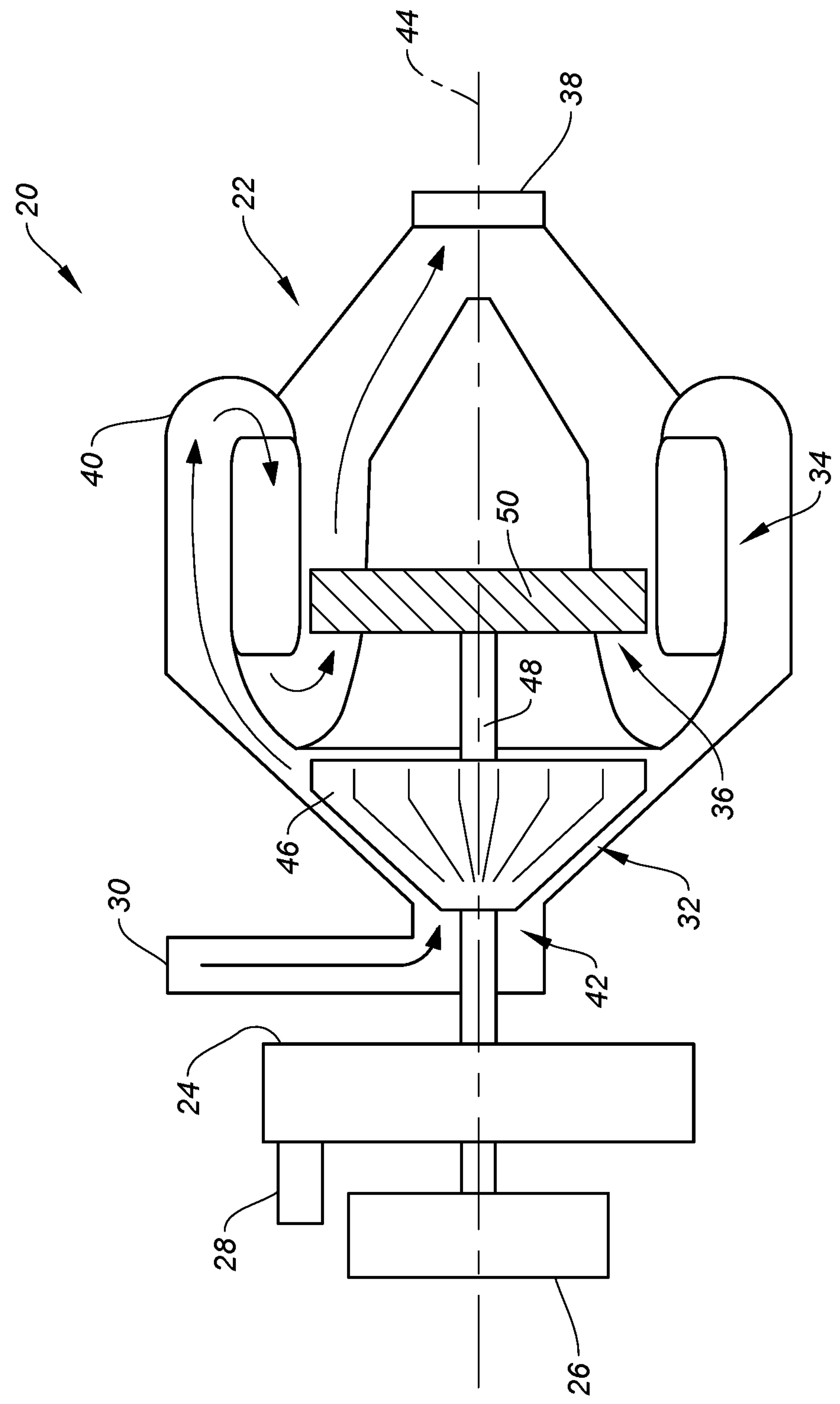
FIG. 2 illustrates a side, cutaway view of an auxiliary power unit (APU) for an aircraft, in accordance with one or more embodiments of the present disclosure.

FIG. 2 illustrates an auxiliary power unit (APU) 20 for the aircraft 100 (see FIG. 1). The APU 20 is configured to supply electricity, compressed air (e.g., compressor bleed air), or hydraulics, or other functions for the aircraft 100 and/or its propulsion systems 102 (see FIG. 1). For example, the APU 20 may supply electricity and/or compressed air to the aircraft 100 while the propulsion system 102 is inoperative, for example, when the aircraft 100 is on the ground. The APU 20 may also operate to supply electricity or compressed air for starting the propulsion system 102 (e.g., initiating an ignition process for the propulsion system 102). The APU 20 of FIG. 2 includes a gas turbine engine 22, a gearbox 24, a main generator 26, and a starter generator 28.

The gas turbine engine 22 of FIG. 2 includes an air inlet 30, a compressor 32, a combustor 34 (e.g., an annular combustor), a turbine 36, an exhaust 38, and an engine static structure 40. The engine static structure 40 may include, for example, one or more engine cases for the gas turbine engine 22. The engine static structure 40 may additionally include cowlings, bearing assemblies, or other structural components of the gas turbine engine 22. The one or more engine cases form, house, and/or structurally support the gas turbine engine 22 components 30, 32, 34, 36, and 38. It should be understood that the APU 20 and its gas turbine engine 22 of FIG. 2 are exemplary and the present disclosure is not limited to the particular APU 20 and/or gas turbine engine 22 configuration of FIG. 2.

The compressor 32 and the turbine 36 are formed, in part, by a rotational assembly 42 (e.g., a spool) of the gas turbine engine 22. The first rotational assembly 42 is mounted for rotation about an axial centerline 44 of the gas turbine engine 22 relative to the engine static structure 40. The rotational assembly 42 includes a bladed compressor rotor 46 (e.g., a centrifugal impeller) for the compressor 32, a shaft 48, and a bladed turbine rotor 50 for the turbine 36. The shaft 48 interconnects the bladed compressor rotor 46 and the bladed turbine rotor 50. The shaft 48 is additionally connected to the gearbox 24.

During operation of the gas turbine engine 22 of FIG. 2, ambient air enters the gas turbine engine 22 through the air inlet 30. The air is compressed by the bladed compressor rotor 46 and directed into a combustion chamber of the combustor 34. Fuel is injected into the combustion chamber and mixed with the compressed air to form a fuel-air mixture. This fuel-air mixture is ignited, and combustion products thereof flow through and cause the bladed turbine rotor 50 to rotate. The rotation of the bladed turbine rotor 50 drives rotation of the rotational assembly 42. The combustion exhaust gas flowing through the bladed turbine rotor 50 is directed out of the gas turbine engine 22 through the exhaust 36.

The gearbox 24 is connected to the shaft 48, as previously discussed. In particular, the gearbox 24 includes a gear assembly (e.g., an epicyclic gear assembly) connected to the shaft 48, which gear assembly is configured to be driven by rotation of the shaft 48. The gearbox 24 may be configured as a speed-changing gearbox. For example, the gearbox 24 may be configured to drive rotation of the main generator 26 (e.g., an input shaft of the main generator 26) at a different (e.g., a reduced) rotation speed relative to the shaft 48.

The main generator 26 is connected to the gearbox 24. The main generator 26 is configured to be driven by the gearbox 24 to generate electric power for the aircraft 100 and/or its propulsion system 102 (see FIG. 1), for example, when the electrical power from the propulsion system 102 or from ground power sources is not available. For example, the main generator 26 may be configured to supply electric power for electrical loads of the aircraft 100 such as, but not limited to, aircraft control systems, environmental control systems (ECS), lighting, and the like.

The starter generator 28 (e.g., a brushless starter generator (BSG)) is coupled to the rotational assembly 42. For example, the starter generator 28 is connected to the gearbox 24 with the gearbox 24 operably coupling the starter generator 28 and the rotational assembly 42. The starter generator 28 may alternatively be directly connected to the rotational assembly 42 (e.g., the shaft 48) or indirectly connected to the rotational assembly 42 by a discrete gearbox (e.g., separate from the gearbox 24), a clutch, or the like. The starter generator 28 is configured to selectively drive rotation of the rotational assembly 42 (e.g., via the gearbox 24). For example, the starter generator is configured to facilitate an engine start sequence for the gas turbine engine 22 by applying a rotational force to the gearbox 24 to rotate the shaft 48. The starter generator 28 may be configured as a direct current (DC) electric motor. For example, the starter generator 28 may be powered by a DC electrical power source to apply the rotational force to the gearbox 24 to rotate the shaft 48. The starter generator 28 may additionally be configured to generate electrical power. For example, with the gas turbine engine 22 operating, the shaft 48 and the gearbox 24 may drive rotation of the starter generator 28 to generate electrical power. The starter generator 28 may generate electrical power in combination with the main generator 26. For example, the main generator 26 may generate electrical power for a high-voltage (e.g., greater than 60 volts) electrical distribution system of the aircraft 100 and/or its propulsion system 102 while the starter generator may generate electrical power for a low-voltage (e.g., less than 60 v) electrical distribution system of the aircraft 100 and/or its propulsion system 102 (see FIG. 1).

In certain operating conditions of the aircraft 100 and its propulsion system 102 (see FIG. 1), the APU 20 may be inoperative. The APU 20 may be inoperative during a flight condition of the aircraft 100, for example, where the propulsion system 102 may be supplying electrical power for the aircraft 100. During this inoperative condition of the APU 20, ambient air flow through components of the APU 20 may cause rotational components of the APU 20, such as the rotational assembly 42, to windmill (e.g., rotate due to ambient air flow). The windmilling effect may cause undesirable wear to APU 20 components. The windmilling effect may additionally or alternatively cause lubricating fluid to circulate through the APU 20, thereby increasing a risk of fire in the APU 20. In certain other operating conditions of the aircraft 100 and its propulsion system 102, the APU 20 may be operating. For example, the gas turbine engine 22 may be driving rotation of the main generator 26 to generate electrical power for the aircraft 100 and/or its propulsion system 102. During some APU 20 operations, the gas turbine engine 22 may experience an overspeed condition. For example, a sudden decrease in electrical loading of the main generator 26 may cause a rotation speed of the rotational assembly 42 to rapidly increase, thereby presenting an increased risk of damage to gas turbine engine 22 components.

Figure 3:
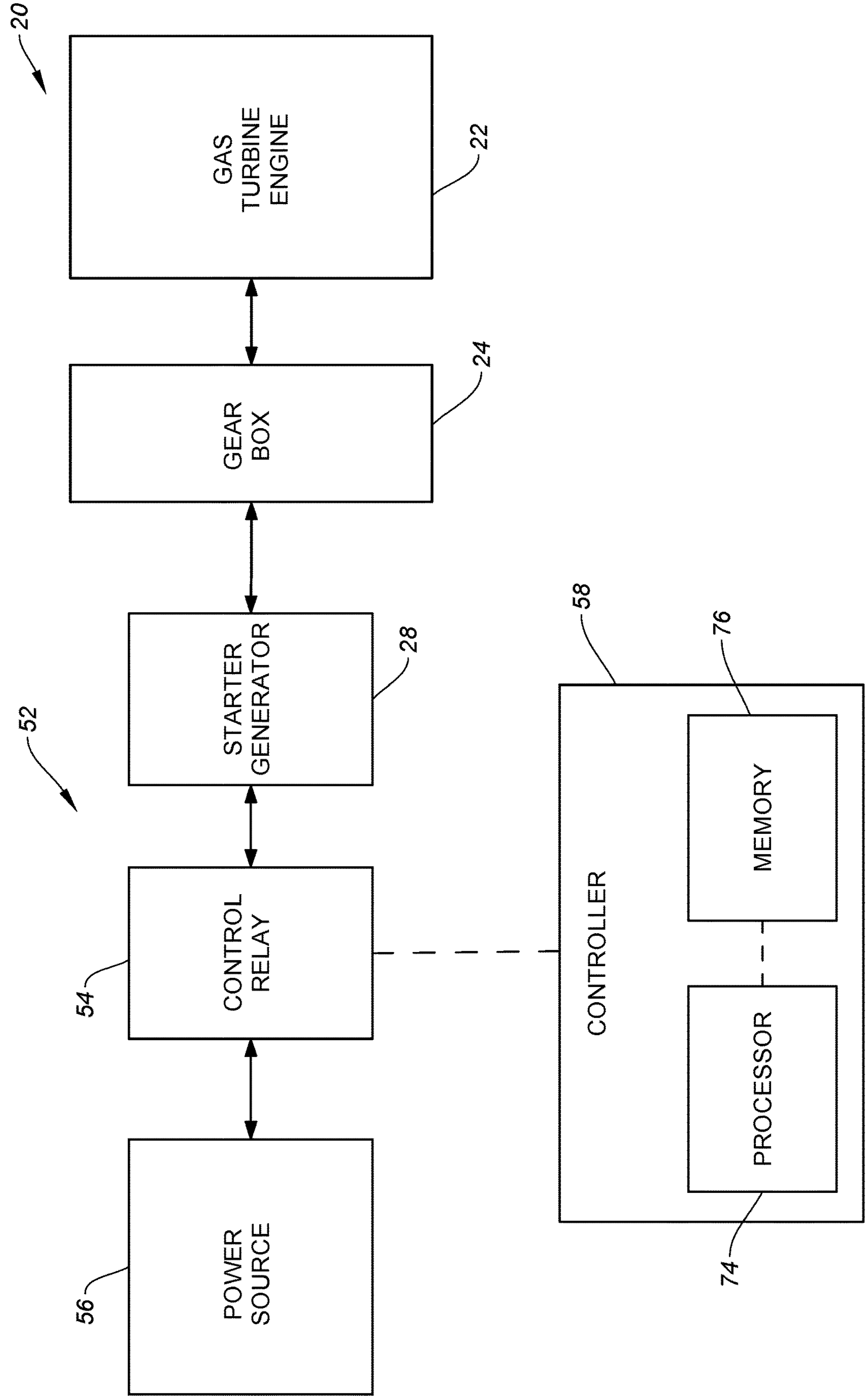
FIG. 3 illustrates a block diagram of a braking control assembly for the APU of FIG. 2, in accordance with one or more embodiments of the present disclosure.

Referring now to FIG. 3, the APU 20 includes a braking control assembly 52 configured to effect braking for the gas turbine engine 22 (e.g., the rotational assembly 42) using the starter generator 28. The braking control assembly 52 includes a control relay 54 configured, in part, to control a supply of electrical power from a power source 56 (e.g., a DC power source) to the starter generator 28 to control operation of the starter generator 28 for facilitating an engine start sequence for the gas turbine engine 22 via the gearbox 24, as previously discussed. The power source 56 may be one or more batteries, one or more capacitors, or any other suitable device for storing electrical energy. The braking control assembly 52 may additionally include a controller 58.

Figure 4:
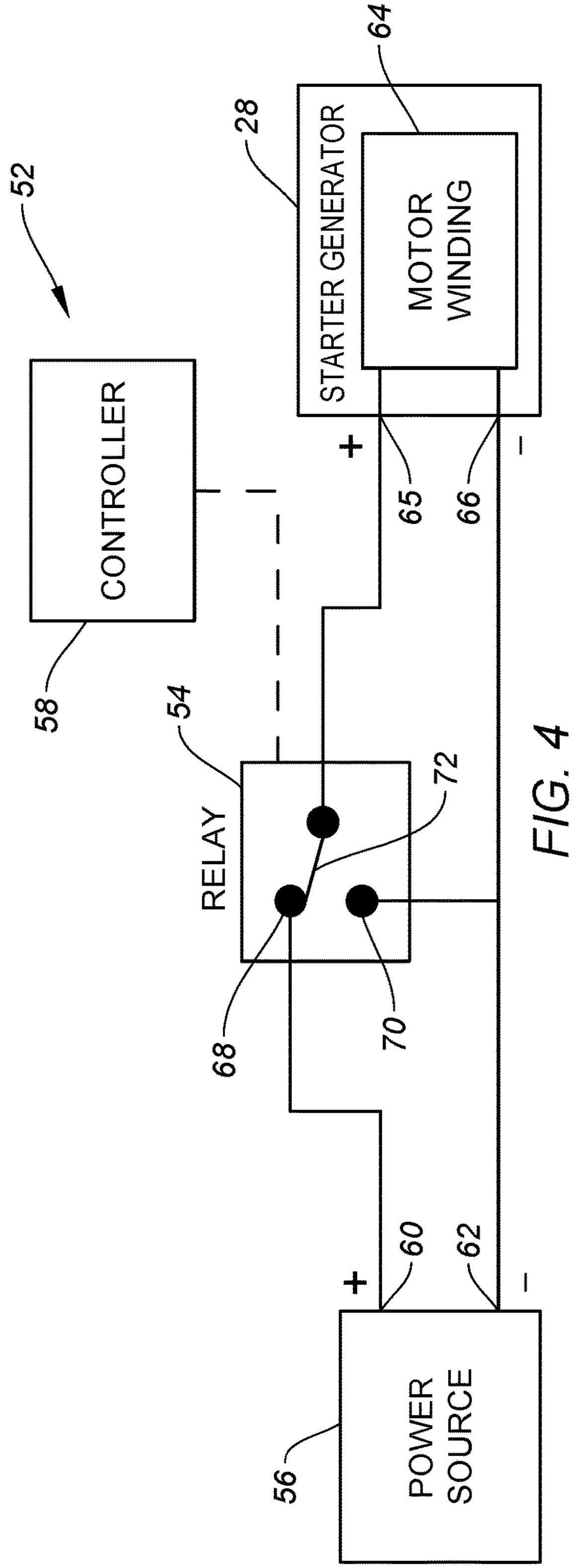
FIG. 4 schematically illustrates a control relay for the braking control assembly of FIG. 3 with the control relay in a starter mode configuration, in accordance with one or more embodiments of the present disclosure.
Figure 5:
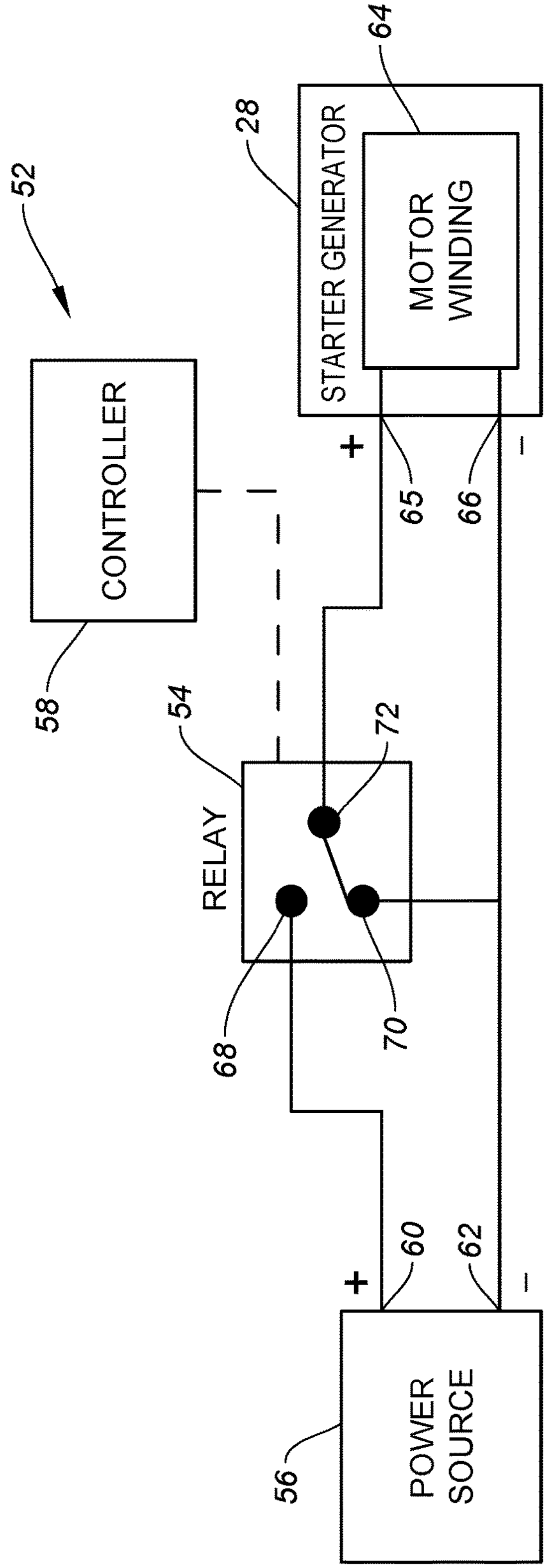
FIG. 5 schematically illustrates a control relay for the braking control assembly of FIG. 3 with the control relay in a braking mode configuration, in accordance with one or more embodiments of the present disclosure.

FIGS. 4 and 5 schematically illustrate the control relay 54 electrically connected with the starter generator 28 and the power source 56. FIG. 4 illustrates the control relay 54 is a starter mode condition. FIG. 5 illustrates the control relay 54 in a braking mode condition. The power source 56 of FIGS. 4 and 5 includes a first electrical terminal 60 (e.g., a positive terminal) and a second electrical terminal 62 (e.g., a negative terminal). The starter generator 28 includes a motor winding 64 (e.g., an electrically conductive coil) having a first electrical terminal 65 (e.g., a positive terminal) and a second electrical terminal 66 (e.g., a negative terminal), such that electrical current flows from one of the first electrical terminal 65 or the second electrical terminal 66, through the motor winding 64, and to the other of the first electrical terminal 65 or the second electrical terminal 66. For example, the motor winding 64 may form a portion of a stator for the starter generator 28. The control relay 54 includes a first contact 68 (e.g., a positive contact), a second contact 70 (e.g., a negative contact), and a switch 72. The first electrical terminal 60 is electrically connected to the first contact 68. The first electrical terminal 65 is electrically connected to the switch 72 (e.g., directly electrically connected to the switch 72, for example, by an insulated wire). The second electrical terminal 62 is electrically connected to the second contact 70. The second electrical terminal 66 is also electrically connected to the second contact 70 (e.g., directly electrically connected to the second contact 70, for example, by an insulated wire). The switch 72 is selectively positionable in electrical contact with the first contact 68 (e.g., a first contact position of the switch 72) or the second contact 70 (e.g., a second contact position of the switch 72). The switch 72 may be manually operated (e.g., physically or remotely) by a pilot or other operator to position the switch 72 in electrical contact with the first contact 68 or the second contact 70. Of course, it should be understood that the electrical connections of FIGS. 4 and 5 described above are exemplary and various different electrical connection configurations between the starter generator 28, the control relay 54, and the power source 56 could be made to accomplish functions of the braking control assembly 52 described herein.

The controller 58 is connected in signal communication with the control relay 54. The controller 58 includes a processor 74 connected in signal communication with memory 76. The processor 74 may include any type of computing device, computational circuit, processor(s), CPU, computer, or the like capable of executing a series of instructions that are stored in the memory 76. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the aircraft 100, the APU 20, and/or the control relay 54 to accomplish the same algorithmically and/or by coordination of the APU 20 components. The memory 76 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 58. The controller 58 may include, or may be in communication with, an input device that enables a user to enter data and/or instructions, and may include, or be in communication with, an output device configured, for example to display information (e.g., a visual display or a printer), or to transfer data, etc. Communications between the controller 58 and other electrical and/or electronic components (e.g., the control relay 54, controllers, sensors, etc.) may be via a hardwire connection or via a wireless connection. A person of skill in the art will recognize that portions of the controller 58 may assume various forms (e.g., digital signal processor, analog device, etc.) capable of performing the functions described herein.

The controller 58 may form or otherwise be part of an electronic engine controller (EEC) for the APU 20. The EEC may control operating parameters of the gas turbine engine 22 including, but not limited to, fuel flow, stator vane position (e.g., variable compressor inlet guide vane (IGV) position), compressor air bleed valve position, shaft (e.g., shaft 48) torque and/or rotation speed, etc. so as to control an engine power or performance of the APU 20. The EEC may modulate fuel flow to the combustor 34 to obtain a desired output power of the gas turbine engine 22. For example, the EEC may modulate the fuel flow using a closed-loop process in which an output power or other operating parameter of the gas turbine engine 22 is measured and fuel flow is increased or decreased as a function of the measured output power or operational parameter. The controller 58 may include or otherwise be connected in signal communication with one or more sensors to measure the output power or operational parameters such as, but not limited, shaft rotation speed sensors, shaft torque sensors, fuel flow rate sensors, pressure sensors, temperature sensors, and the like. In some embodiments, the EEC may be part of a full authority digital engine control (FADEC) system for the aircraft 100 (see FIG. 1).

The switch 72 may be positioned in contact with the first contact 68 or the second contact 70 to place the control relay 54 in the starter mode condition (see FIG. 4) or the braking mode condition (see FIG. 5), respectively. The control relay 54 may be placed in the starter mode condition before or during operation of the gas turbine engine 22 (see FIGS. 2 and 3). With the control relay 54 in the starter mode condition, the switch 72 is positioned in contact with the first contact 68, thereby forming an electrical flow path (e.g., a circuit) between the power source 56 and the starter generator 28. In this position of the switch 72, the first electrical terminal 65 is electrically isolated from the second electrical terminal through the switch 72 (e.g., electrical current cannot flow directly from the first electrical terminal 65 to the second electrical terminal 66 through the switch 72). For example, the control relay 54 may be placed in the starter mode condition before operation of the gas turbine engine 22 to supply electrical power from the power source 56 to the starter generator 28 to facilitate an engine start sequence for the gas turbine engine 22 by applying a rotational force to the gearbox 24 with the starter generator 28 to rotate the shaft 48. For further example, the control relay 54 may be placed in (or may remain in after the engine start sequence) the starter mode condition during operation of the gas turbine engine 22 to facilitate electrical generation using the starter generator 28, as described above. The electrical power generated by the starter generator 28 may be used to power one or more electrical loads and/or may be stored by the power source 56.

The control relay 54 may be placed in the braking mode condition during an inoperative condition of the gas turbine engine 22. For example, the control relay 54 may be placed in the braking mode condition during a flight condition of the aircraft 100 (see FIG. 1), facilitate reduced or prevented windmilling of the gas turbine engine 22 components. With the control relay 54 in the braking mode condition, the switch 72 is positioned in contact with the second contact 70, thereby directly electrically connecting the first electrical terminal 65 and the second electrical terminal 66 of the starter generator 28 together through the switch 72 such that a closed electrical circuit is formed through the motor winding 64, the first electrical terminal 65, the second electrical terminal 66, and the switch 72. For example, windmilling of the rotational assembly 42 may rotationally drive the starter generator 28 (e.g., via the gearbox 24) inducing an electrical current flow in the motor winding 64 and through the electrically-connect terminals 65, 66, forming a magnetic field in opposition to a magnetic field (e.g., a permanent magnet magnetic field) of a rotor of the starter generator 28, and thereby applying a braking force to the rotational assembly 42 by opposing rotation (e.g., windmilling) of the rotational assembly 42. Similarly, the control relay 54 may be placed in the braking mode condition in an operational condition of the gas turbine engine 22 in response to or in expectation of an overspeed condition for the gas turbine engine 22 (e.g., the rotational assembly 42). With the switch 72 is positioned in contact with the second contact 70, the electrical flow path between the power source 56 and the starter generator 28 is interrupted. In other words, with the switch 72 is positioned in contact with the second contact 70, the power source 56 cannot supply electrical power to the starter generator 28 and the starter generator cannot supply electrical power to the power source 56.

The controller 58 may be configured to control a condition (e.g., the starter mode condition or the braking mode condition) for the control relay 54 based on one or more conditions or operations of the APU 20. For example, the memory 76 may include instructions which, when executed by the processor 74, cause the processor 74 to control a contact position of the switch 72.

The controller 58 may be configured to place the control relay 54 in the braking mode condition during a shutdown process for the APU 20 to prevent subsequent windmilling of the rotational assembly 42 as the rotational assembly 42 slows or stops. Accordingly, the control relay 54 may be placed in the braking mode condition as the rotational assembly 42 approaches a stopped condition. The controller 58 may place the control relay 54 in the braking mode condition once a rotation speed of the rotational assembly 42 reaches a rotation speed threshold value. The rotation speed threshold value may be selected to correspond to a sufficiently low rotation speed of the rotational assembly 42 such that the starter generator 28 does not experience excessive heating during the braking process. For example, the rotation speed threshold value may be a rotation speed which is less than or equal to ten percent of a rated rotation speed for the rotational assembly 42.

The controller 58 may be configured to identify a windmilling condition of the rotational assembly 42 and place the control relay 54 in the braking mode condition in response to the identified windmilling condition. For example, the controller 58 may be configured to identify rotation (e.g., a rotation speed) of the rotational assembly 42 while the APU 20 is inoperative. Identification of the windmilling condition may be identified by the controller 58 if a rotation speed of the rotational assembly 42 is greater than or equal to a first rotation speed threshold value. The controller 58 may be configured to place the control relay 54 in the braking mode condition, for example, until the rotation speed of the rotational assembly 42 decreases to or below a second rotation speed threshold value (e.g., less than the first rotation speed threshold value), at which point the controller 58 may place the control relay 54 in the starter mode condition. Alternatively, the controller 58 may cause the control relay 54 to remain in the braking mode condition until startup of the APU 20 is desired. The controller 58 may additionally or alternatively be configured to place the control relay 54 in the braking mode condition after identifying one or more operational conditions of the aircraft 100, the propulsion system 102, and/or the APU 20, in which operating conditions windmilling of the rotational assembly 42 may be likely (e.g., during flight, during taxiing, etc.).

The controller 58 may be configured to identify a casualty condition of the APU 20 (e.g., a fire) and place the control relay 54 in the braking mode condition in response to the identified casualty condition. Braking of the rotational assembly 42 by placing the control relay 54 in the braking mode condition may mitigate fire damage to the APU 20 and/or the aircraft 100 by preventing windmilling of the rotational assembly 42, which windmilling may cause flammable or otherwise combustible lubricating fluid to circulate within the APU 20.

The controller 58 may be configured to identify an overspeed condition of the rotational assembly 42 and place the control relay 54 in the braking mode condition in response to the identified overspeed condition. For example, the controller 58 may be configured to identify a rotation speed of the rotational assembly 42 which exceeds a first rotation speed threshold value. The controller 58 may be configured to place the control relay 54 in the braking mode condition, for example, until the rotation speed of the rotational assembly 42 decreases to or below a second rotation speed threshold value (e.g., less than the first rotation speed threshold value), at which point the controller 58 may place the control relay 54 in the starter mode condition. The first rotation speed threshold value and the second rotation speed threshold value may be selected or determined by the controller 58 based, for example, on a target rotation speed value for the rotational assembly 42.

Figure 6:
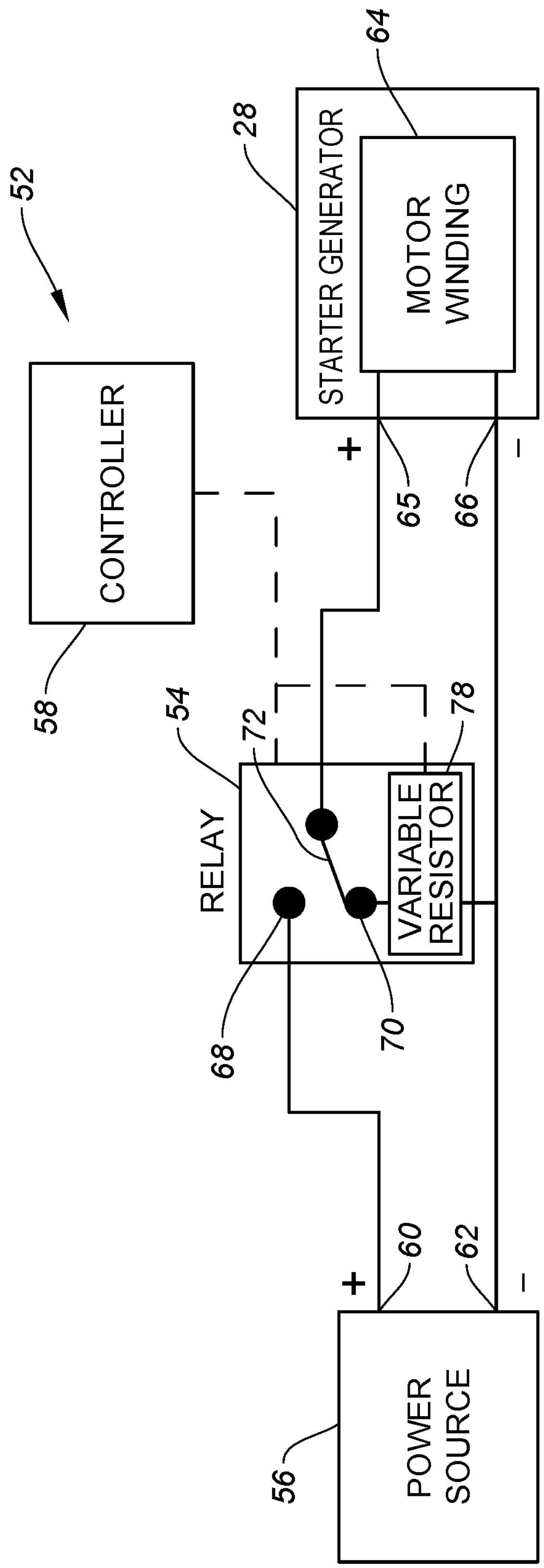
FIG. 6 schematically illustrates another control relay for the braking control assembly of FIG. 3, in accordance with one or more embodiments of the present disclosure.

Referring to FIG. 6, in some embodiments, the control relay 54 may include a variable resistor 78. The variable resistor 78 is configured to selectively vary an electrical resistance for electrical current flow through the variable resistor 78. The variable resistor 78 may be electrically connected between the second contact 70 and the second electrical terminals 62, 66. Accordingly, with the switch 72 positioned in contact with the second contact 70 (e.g., the control relay 54 in the braking mode condition), the variable resistor 78 may selectively vary an electrical resistance between the first electrical terminal 65 and the second electrical terminal 66 to control an electrical current flow therebetween. Accordingly, the variable resistor 78 may be used to control (e.g., modulate) a magnitude of the braking force applied by the starter generator 28 to the rotational assembly 42. The variable resistor 78 may be connected in signal communication with the controller 58 such that the controller 58 may control an electrical resistance of the variable resistor 78 to control the magnitude of the braking effect applied by the starter generator 28 to the rotational assembly 42.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises"

means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for a gas turbine engine of an aircraft, the assembly comprising:

a rotational assembly;

a starter generator coupled with the rotational assembly, the starter generator is configured to selectively drive rotation of the rotational assembly, and the starter generator includes a motor winding including a first electrical terminal and a second electrical terminal;

a control relay including a variable resistor and a switch, the switch electrically connected to the first electrical terminal, the switch is positionable in a first contact position and a second contact position, in the first contact position, the first electrical terminal is electrically isolated from the second electrical terminal through the switch, and in the second contact position, the first electrical terminal is electrically connected to the second electrical terminal through the switch such that a closed electrical circuit is formed through the motor winding, the first electrical terminal, the switch, and the second electrical terminal, and in the second contact position, the variable resistor is configured to selectively vary an electrical resistance between the first electrical terminal and the second electrical terminal;

the starter generator further configured to resist rotation of the rotational assembly with the switch in the second contact position; and a controller connected in communication with the control relay, the controller includes a processor in communication with a non-transitory memory storing instructions, the storing instructions, when executed by the processor, cause the processor to:

control the control relay to position the switch in the first contact position or the second contact position; and control the variable resistor to control the electrical resistance between the first electrical terminal and the second electrical terminal.

2. The assembly of claim 1, further comprising a battery electrically connected to the starter generator and the switch such that, in the first contact position, the battery is configured to supply electrical power to the starter generator.

3. The assembly of claim 1, wherein the starter generator is configured to drive rotation of the rotational assembly with the switch in the first contact position.

4. The assembly of claim 1, wherein the starter generator is coupled with the rotational assembly by a gearbox.

5. The assembly of claim 1, wherein the rotational assembly includes a shaft, a bladed compressor rotor, and a bladed turbine rotor, and the shaft interconnects the bladed compressor rotor and the bladed turbine rotor.

6. The assembly of claim 5, further comprising a main generator coupled with the rotational assembly, the rotational assembly configured to drive rotation of the main generator.

7. The assembly of claim 1, wherein the instructions, when executed by the processor, further cause the processor to control the control relay to position the switch in the second contact position during a shutdown process for the gas turbine engine.

8. The assembly of claim 7, wherein the instructions, when executed by the processor, further cause the processor to control the control relay to position the switch in the second contact position during the shutdown process for the gas turbine engine when a rotation speed of the rotational assembly decreases to or below a rotation speed threshold value.

9. The assembly of claim 1, wherein the instructions, when executed by the processor, further cause the processor to control the control relay to position the switch in the second contact position during a flight condition of the aircraft.

10. The assembly of claim 1, wherein the instructions, when executed by the processor, further cause the processor to control the control relay to position the switch in the second contact position during an overspeed condition of the rotational assembly.

11. An assembly for a gas turbine engine of an aircraft, the assembly comprising:

a rotational assembly;

a starter generator coupled with the rotational assembly, the starter generator is configured to selectively drive rotation of the rotational assembly, and the starter generator includes a motor winding including a first electrical terminal and a second electrical terminal;

a control relay including a switch electrically connected to the first electrical terminal, the switch is positionable in a first contact position and a second contact position, in the first contact position, the first electrical terminal is electrically isolated from the second electrical terminal through the switch, and in the second contact position, the first electrical terminal is electrically connected to the second electrical terminal through the switch such that a closed electrical circuit is formed through the motor winding, the first electrical terminal, the switch, and the second electrical terminal; and a controller connected in communication with the control relay, the controller includes a processor in communication with a non-transitory memory storing instructions, the storing instructions, when executed by the processor, cause the processor to control the control relay to position the switch in the first contact position or the second contact position;

wherein the starter generator is configured to drive rotation of the rotational assembly with the switch in the first contact position; and wherein the control relay includes a variable resistor, and with the switch in the second contact position, the variable resistor is configured to selectively vary an electrical resistance between the first electrical terminal and the second electrical terminal.

12. The assembly of claim 11, further comprising a battery electrically connected to the starter generator and the switch such that, in the first contact position, the battery is configured to supply electrical power to the starter generator.

13. The assembly of claim 11, wherein the instructions, when executed by the processor, further cause the processor to control the control relay to position the switch in the second contact position during a shutdown process for the gas turbine engine.

14. The assembly of claim 11, wherein the instructions, when executed by the processor, further cause the processor to control the control relay to position the switch in the second contact position during a flight condition of the aircraft.

15. The assembly of claim 11, wherein the instructions, when executed by the processor, further cause the processor to control the control relay to position the switch in the second contact position during an overspeed condition of the rotational assembly.

* * * * *